(12) United States Patent
Anzai

(10) Patent No.: US 8,078,147 B2
(45) Date of Patent: Dec. 13, 2011

(54) MOBILE TERMINAL SYSTEM, MOBILE TERMINAL APPARATUS, AND FUNCTION LOCKING METHOD

(75) Inventor: Jun Anzai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 12/094,979

(22) PCT Filed: Sep. 27, 2006

(86) PCT No.: PCT/JP2006/319198
§ 371 (c)(1),
(2), (4) Date: May 23, 2008

(87) PCT Pub. No.: WO2008/038355
PCT Pub. Date: Apr. 3, 2008

(65) Prior Publication Data
US 2009/0042613 A1    Feb. 12, 2009

(51) Int. Cl.
*H04M 1/66* (2006.01)
*H04B 1/38* (2006.01)
(52) U.S. Cl. .................. 455/411; 455/410; 455/558
(58) Field of Classification Search ............... 455/556.1, 455/558, 575.1, 90.3, 410–411
See application file for complete search history.

(56) References Cited

U.S. PATENT DOCUMENTS

| | | | |
|---|---|---|---|
| 4,749,982 A | 6/1988 | Rikuna | |
| 7,043,269 B2 * | 5/2006 | Ono et al. | 455/558 |
| 7,151,922 B2 * | 12/2006 | Sashihara et al. | 455/412.2 |
| 7,283,430 B2 * | 10/2007 | Voltz | 369/30.36 |
| 2002/0103009 A1 | 8/2002 | Sato | |
| 2006/0264240 A1 * | 11/2006 | Arai | 455/558 |

FOREIGN PATENT DOCUMENTS

| | | |
|---|---|---|
| JP | 61-018083 | 1/1986 |
| JP | 3039719 | 5/1997 |
| JP | 11-238105 | 8/1999 |
| JP | 11-298956 | 10/1999 |
| JP | 2002-009921 | 1/2002 |
| JP | 2002-218536 | 8/2002 |

OTHER PUBLICATIONS

International Search Report dated Oct. 31, 2006.

* cited by examiner

*Primary Examiner* — George Eng
*Assistant Examiner* — Nam Huynh
(74) *Attorney, Agent, or Firm* — Seed IP Law Group PLLC

(57) ABSTRACT

A mobile terminal system is provided whereby, when a memory card or memory card with an IC function inserted in a mobile terminal apparatus is removed, a function of at least one of the apparatus itself and/or the memory card is locked easily by means of an intuitive operation by the user. This mobile terminal system (100) has a memory card (300) and a mobile terminal (200) in which the memory card (300) is inserted in a removable fashion. The mobile terminal (200) detects lengthy depression of a pressure section (202) pressed by the user by means of a long-depression detection section (204), and detects insertion of the memory card (300) inserted into a slot section (206) in a removable fashion by means of a card insertion/removal detection section (208). A locking execution section (218) locks or unlocks a function of at least one of the terminal (200) itself and/or the memory card (300). When the memory card (300) is removed from the slot section (206) during lengthy depression of the pressure section (202), the mobile terminal (200) locks or unlocks a function of at least one of the two using the locking execution section (218) via a terminal control section (220).

16 Claims, 9 Drawing Sheets

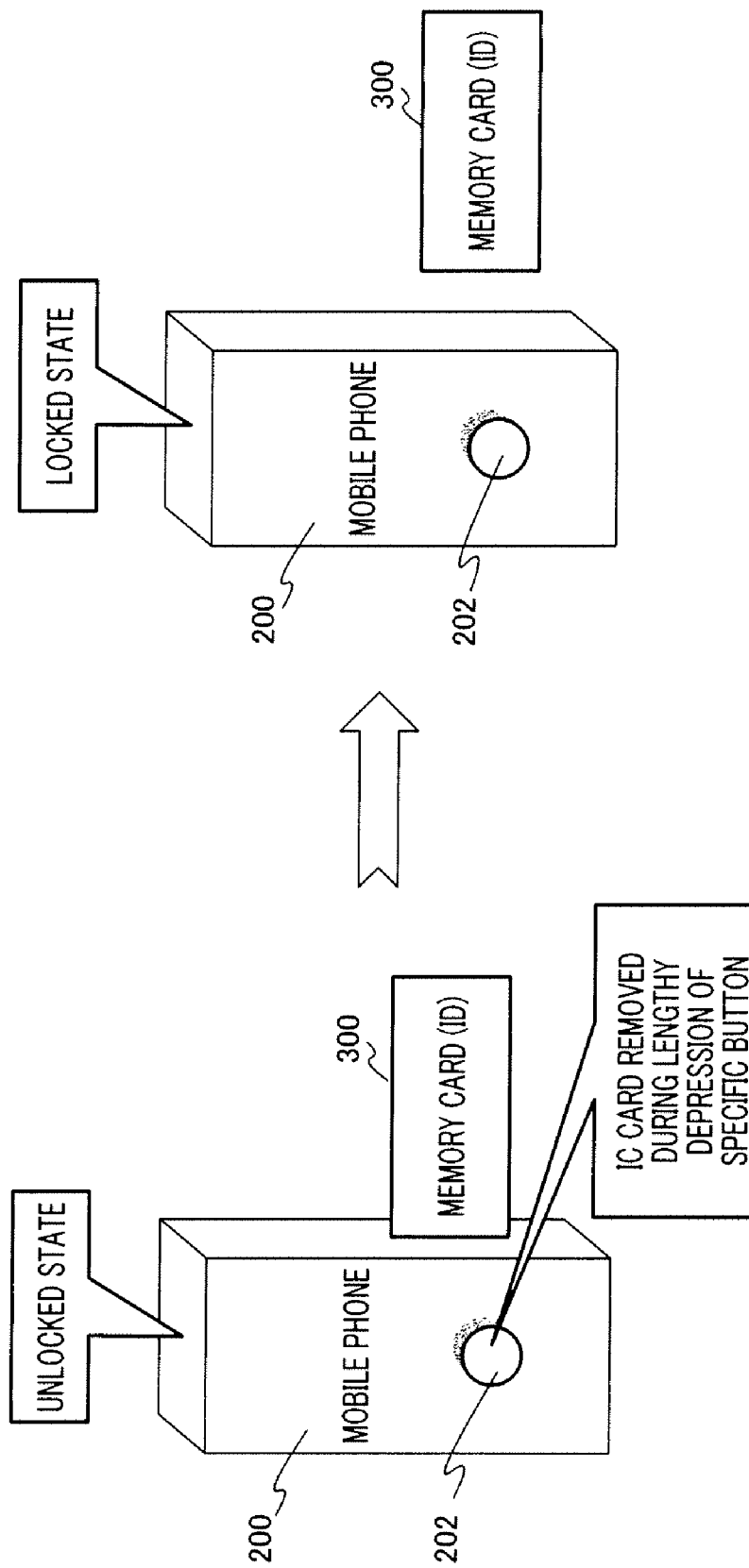

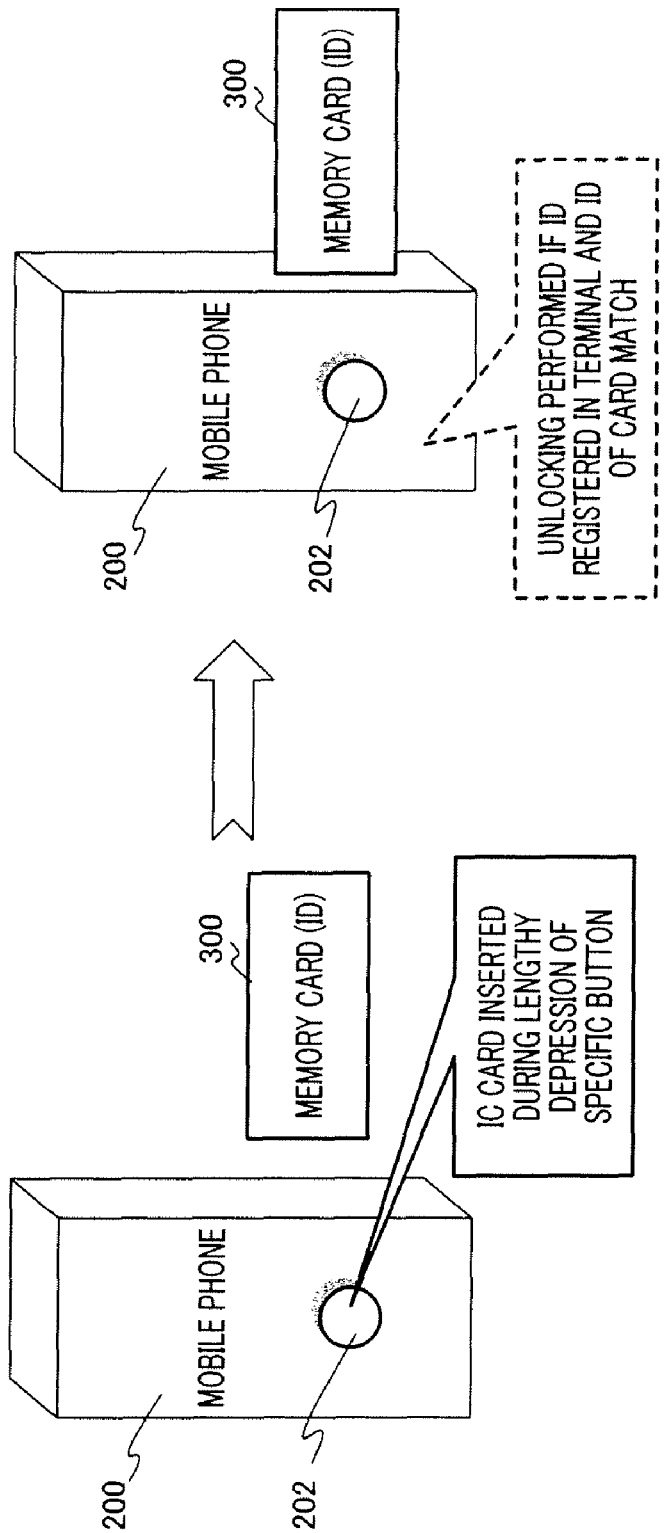

MOBILE TERMINAL SYSTEM, MOBILE TERMINAL APPARATUS, AND FUNCTION LOCKING METHOD

TECHNICAL FIELD

The present invention relates to a mobile terminal system having a mobile terminal apparatus allowing insertion and removal of a memory card with an IC function, a mobile terminal apparatus, and a function locking method.

BACKGROUND ART

Mobile phone radio terminals (referred to as a "mobile terminals") in a mobile phone system using PHS (Personal Handyphone System), GSM (Global System for Mobile Communications), IMT-2000 (International Mobile Telecommunication 2000), W-CDMA (Wideband Code Division Multiple Access), or the like, are known that enable a removable memory card to be inserted, and user information, data downloaded via a radio channel, data stored in memory installed in the terminal, and so forth, to be recorded. Also, mobile terminals of a mobile terminal system are known in which a memory card with an IC function such as a GSM SIM (Subscriber Identity Module) or an IMT-2000 or W-CDMA UIM (User Identity Module) is inserted in a removable fashion.

With a mobile terminal allowing insertion of such a memory card or memory card with an IC function, there are no particular restrictions on the removal of a memory card or memory card with an IC function. Therefore, if a terminal from which a memory card or memory card with an IC function has been removed is left lying around, is lost, or is otherwise separated from its user, there is a risk of improper use. Similarly, if a memory card or memory card with an IC function that has been removed from a terminal is left lying around, is lost, or is otherwise separated from its user, there is a risk of internally stored information being improperly read by means of another reading apparatus or the like.

Various measures have therefore been considered for locking a mobile terminal function or memory card function.

For example, as a terminal-side functional restriction, Patent Document 1 describes performing mobile phone dial locking using an operating section of an external apparatus. Also, Patent Document 2 discloses a mobile phone allowing insertion of a UIM card that is configured so that the mobile phone is enabled for use (unlocked) when a UIM card is inserted into a socket of the mobile phone. Furthermore, Patent Document 3 discloses a technology that locks a card inserted in a radio terminal. With a radio terminal according to Patent Document 3, when a user requests removal of an IC card 2, user authentication is performed by a removal authorization processing section. If the authentication is not OK, the IC card is locked, and if the IC card 2 is removed from the radio terminal 1 in this state, the IC card control section in the IC card prevents the contents of information stored in the memory section from being viewed.

Patent Document 1: Japanese Patent Publication No. 3022832
Patent Document 2: Japanese Patent Publication No. 3576977
Patent Document 3: Unexamined Japanese Patent Publication No. 2002-9921

DISCLOSURE OF INVENTION

Problems to be Solved by the Invention

A desire for a mobile terminal allowing insertion of a memory card or memory card with an IC function is that, when a memory card or memory card with an IC function is removed from the terminal, a function of at least one of the two should be locked by means of a simple operation.

However, even if such implementation is attempted using the technology of Patent Document 1, implementation is not possible because it is necessary to consider an IC card to be inserted to be an external apparatus, and to provide a button as an operating section on the IC card side.

Also, in the case of Patent Document 2, locking/unlocking is set by means of a mobile terminal setting screen or the like, which is laborious, while in the case of Patent Document 3, an authentication operation occurs before a card is removed, which is also a laborious procedure.

It is an object of the present invention to provide a mobile terminal system, mobile terminal apparatus, and function locking method whereby, when a memory card or memory card with an IC function inserted in a mobile terminal apparatus is removed, a function of at least one of the apparatus itself and/or the memory card is locked easily by means of an intuitive operation by the user.

Means for Solving the Problems

A mobile terminal system of the present invention employs a configuration wherein, in a mobile terminal system having a memory card and a mobile terminal apparatus in which the memory card is inserted in a removable fashion, the mobile terminal apparatus includes: a pressure section that is pressed by a user; a long-depression detection section that detects lengthy depression of the pressure section; a card insertion section in which the memory card is inserted in a removable fashion; an insertion/removal detection section that detects insertion/removal of the memory card into/from the card insertion section; a locking section that locks or unlocks a function of at least one of the apparatus itself and/or the memory card; and a control section that, when detection information from the long-depression detection section and insertion/removal detection section is input, and the memory card is inserted into or removed from the card insertion section during lengthy depression of the pressure section, locks or unlocks a function of at least one of the two using the locking section.

According to this configuration, when a memory card is inserted or removed during lengthy depression of a pressure section, a function of at least one of the apparatus and/or the memory card is locked or unlocked, enabling a user to easily lock or unlock a function of at least one of the apparatus and/or the memory card by means of an intuitive operation of inserting or removing a memory card while pressing the pressure section for a lengthy period.

Advantageous Effect of the Invention

As described above, according to the present invention, when a memory card or memory card with an IC function inserted in a mobile terminal apparatus is removed, a function of at least one of the apparatus itself and/or the memory card is locked easily by means of an intuitive operation by the user.

BRIEF DESCRIPTION OF DRAWINGS

FIG. 4 is a conceptual diagram illustrating a mobile terminal for which terminal function locking processing is performed;

FIG. 5 is a conceptual diagram illustrating a mobile terminal for which terminal function unlocking processing is performed;

BEST MODE FOR CARRYING OUT THE INVENTION

An embodiment of the present invention will now be described in detail with reference to the accompanying drawings.

Figure 1:
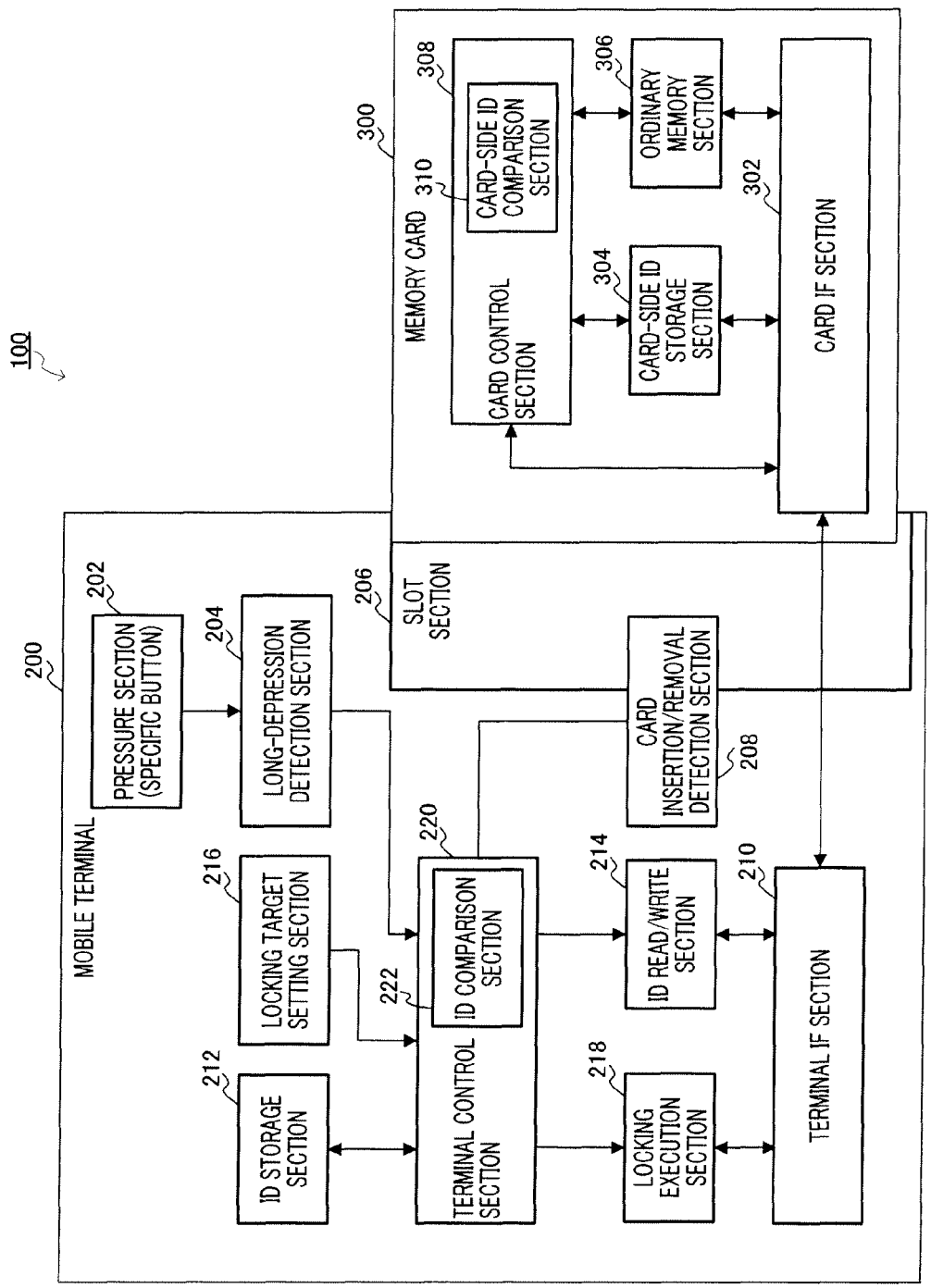
FIG. 1 is a block diagram showing the configuration of a mobile terminal system according to one embodiment of the present invention.

FIG. 1 is a block diagram showing the configuration of a mobile terminal system 100 according to one embodiment of the present invention.

Mobile terminal system 100 has a mobile terminal 200 of the present invention, and a memory card 300 that can be inserted in mobile terminal 200.

Mobile terminal 200 is a mobile phone or the like, and has a pressure section 202 such as a specific button, a long-depression detection section 204, a slot section 206, a card insertion/removal detection section 208, a terminal IF section 210, an ID storage section 212, an ID read/write section 214, a locking target setting section 216, a locking execution section 218, and a terminal control section 220.

Pressure section 202 comprises a specific button or the like fitted to the main body 200a of mobile terminal 200 so as to be able to be pressed by a user (see FIG. 3), and may, for example, be provided as part of a key input section (not shown) used to operate various functions of mobile terminal 200. By means of pressure section 202, a user can perform a "short-depression" operation lasting a short time or a "long-depression" operation lasting a predetermined time (for example, one second) or longer.

Pressure section 202 may comprise a single button or a plurality of buttons. In this embodiment, pressure section 202 is described as a single button, as shown in FIG. 3. If the pressure section comprises a plurality of buttons, a possible configuration would enable the terminal control section to perform ID registration and locking/unlocking by simultaneous lengthy depression of a plurality of buttons.

Long-depression detection section 204 has a timer, and using this timer, detects a long-depression state of pressure section 202 when pressure section 202 (for example, a specific button) has been pressed for a predetermined time (for example, one second), and outputs a corresponding signal to terminal control section 220.

Slot section (card insertion section) 206 is provided in main body 200a of mobile terminal 200 (see FIG. 3), and allows insertion of memory card 300 in a removable fashion. When memory card 300 is inserted into slot section 206, terminal IF section 210 and a card IF section 302 are connected, and memory card 300 is in the "inserted in mobile terminal 200" state.

card insertion/removal detection section 208 detects insertion/removal of memory card 300 inserted into slot section 206, and outputs a corresponding signal to terminal control section 220.

Terminal IF (interface) section 210 is connected to card IF section 302 of memory card 300 inserted in slot section 206, thereby enabling mobile terminal 200 to perform reading/writing of information from/to memory card 300.

ID storage section 212 stores an ID identifying memory card 300 inserted in mobile terminal 200 via slot section 206, and the stored ID is read/written by terminal control section 220. If a memory card does not already hold an ID, an ID read from terminal control section 220 and written to memory card 300 via ID read/write section 214 may be held in this ID storage section 212.

In response to a directive from terminal control section 220, ID read/write section 214 performs ID writing and ID reading to/from a card-side ID storage section 304 of memory card 300 via terminal IF section 210 connected to card IF section 302. By means of this processing by ID read/write section 214 and terminal control section 220, mobile terminal 200 and memory card 300 hold an ID identifying memory card 300.

With regard to an ID written to memory card 300 by ID read/write section 214, an ID may be read from ID storage section 212 via terminal control section 220 and written to card-side ID storage section 304 of memory card 300.

Locking target setting section 216 sets a function to be locked for at least one of mobile terminal 200 and/or memory card 300 when memory card 300 is removed from mobile terminal 200, and outputs this setting to terminal control section 220. Possible functions to be locked include dialing, power supply, incoming calls, information reading/writing from/to a memory card, and other functions of mobile terminal 200, and the storage function of a memory card itself. Locking target setting section 216 may, for example, have a configuration whereby functions to be locked are displayed on a display section (not shown) of mobile terminal 200, and terminal control section 220 is controlled by having the user make a selection from the display section via the key input section. By means of this locking target setting section 216, the user can be required to select a function of mobile terminal 200 or memory card 300 to be locked, and any function can be locked.

If a memory card with an IC function is inserted into mobile terminal 200 instead of memory card 300, some of the functions in the memory card with an IC function (for example, secure area reading/writing or the like) are locked.

In response to a directive from terminal control section 220 or a request from memory card 300, locking execution section 218 performs locking processing and unlocking processing for mobile terminal 200 functions and all or some functions relating to memory card storage. Here, a function locked or unlocked by this locking execution section 218 is a function set by locking target setting section 216.

Specifically, if memory card 300 inserted in mobile terminal 200 does not have an IC function, locking execution section 218 has a directive for locking or unlocking a target function set by locking target setting section 216 input from terminal control section 220.

Terminal control section 220 has a CPU, RAM, ROM, and so forth, and is connected to long-depression detection section 204, card insertion/removal detection section 208, ID storage section 212, ID read/write section 214, locking target setting section 216, and locking execution section 218, and controls these sections. Terminal control section 220 may also perform overall control of sections that implement operation as a radio terminal such as a mobile phone by means of various software processing.

Terminal control section 220 has a locking target function set by locking target setting section 216 as input.

If memory card 300 is inserted into slot section 206 during lengthy depression of pressure section (hereinafter referred to as "specific button") 202, terminal control section 220 shares an ID with inserted memory card 300.

With regard to ID sharing, the processing of terminal control section 220 differs according to whether or not inserted memory card 300 has an ID identifying the card itself.

If the specific button is in the long-depression state and a card is currently inserted according to long-depression information input from long-depression detection section 204 and card insertion/removal information input from card insertion/removal detection section 208, terminal control section 220 determines whether or not an ID has been read from memory card 300 via ID read/write section 214.

If an ID has not been read from memory card 300 when memory card 300 is inserted into slot section 206 during lengthy depression of specific button 202, terminal control section 220 writes an ID to card-side ID storage section 304 by means of ID read/write section 214. By this means, an ID is stored in card-side ID storage section 304 of memory card 300, and an ID is registered in memory card 300. The ID stored in card-side ID storage section 304 of memory card 300 is associated with an ID in ID storage section 212.

If an ID is read from memory card 300 via ID read/write section 214 when memory card 300 is inserted into slot section 206 during lengthy depression of specific button 202, terminal control section 220 stores the read ID in ID storage section 212. By this means, mobile terminal 200 registers an ID identifying memory card 300 in ID storage section 212.

If memory card 300 is inserted without specific button 202 being pressed according to long-depression information input from long-depression detection section 204 and card insertion/removal information input from card insertion/removal detection section 208, terminal control section 220 does not perform ID sharing with memory card 300.

If memory card 300 is removed from slot section 206 during lengthy depression of specific button 202, terminal control section 220 performs locking or unlocking processing for a target function set by locking target setting section 216 via locking execution section 218.

More specifically, if the specific button is in the long-depression state and memory card 300 is removed from slot section 206 according to long-depression information input from long-depression detection section 204 and card insertion/removal information input from card insertion/removal detection section 208, terminal control section 220 locks a function set by locking target setting section 216 via locking execution section 218.

If a function set as a locking target by locking target setting section 216 is a function on the mobile terminal side, terminal control section 220 stops the functioning of a configuration element that executes the corresponding function in mobile terminal 200 via locking execution section 218.

Terminal control section 220 has an ID comparison section 222 that, if specific button 202 is in the long-depression state and a memory card is inserted from slot section 206 according to long-depression information input from long-depression detection section 204 and card insertion/removal information input from card insertion/removal detection section 208, compares an ID from memory card 300 and an ID of ID storage section 212.

If the IDs compared by ID comparison section 222 match, terminal control section 220 unlocks a locked function via locking execution section 218.

Memory card 300 inserted into mobile terminal 200 configured in this way is a memory card with an IC function, and has a card IF section 302, card-side ID storage section 304, ordinary memory section 306, and card control section 308.

Card IF (interface) section 302 is connected to terminal IF section 210 when the memory card is inserted into slot section 206, and together with terminal IF section 210 enables data to be exchanged between mobile terminal 200 and memory card 300.

Card-side ID storage section 304 stores an ID identifying memory card 300, holding the ID in advance or storing it by means of a write by mobile terminal 200 in which memory card 300 is inserted. By this means, a state is effected in which an ID identifying the memory card itself is registered in memory card 300.

When memory card 300 is inserted into mobile terminal 200, ordinary memory section 306 records user information, data downloaded via a radio channel, data stored in memory installed in the terminal, and so forth, by means of a mobile terminal 200 operation.

Card control section 308 is connected to card IF section 302, card-side ID storage section 304, and ordinary memory section 306, and controls these sections.

Here, card control section 308 has a card-side ID comparison section 310 that compares an ID stored in card-side ID storage section 304 with an ID input from mobile terminal 200 in which memory card 300 is inserted.

If an input ID and an ID stored by card-side ID storage section 304 match, card-side ID comparison section 310 performs locking or unlocking of ordinary memory section 306 for mobile terminal 200 in which memory card 300 is inserted. When functions are to be partially locked in memory card 300, such as when memory card 300 has a secure area, card-side ID comparison section 310 partially locks memory card 300 functions and inhibits reading and writing by an apparatus in which memory card 300 is inserted.

Memory card 300 has been assumed to be a memory card with an IC function, but may also be a memory card without an IC function—that is, a memory card that has card IF section 302, card-side ID storage section 304, and ordinary memory section 306, but is not equipped with card control section 308.

Next, the operation of mobile terminal system 100 having the above configuration will be described. In mobile terminal system 100, if memory card 300 is removed during lengthy depression of specific button 202 on mobile terminal 200, switching of a function of at least one of mobile terminal 200 and/or memory card 300 is performed, in contrast to a case in which memory card 300 is removed other than during lengthy depression of specific button 202.

Specifically, in mobile terminal system 100, removing memory card 300 during lengthy depression of specific button 202 results in mobile terminal function locking, memory card locking, or memory card function locking being performed.

<Terminal Function Locking>

Figure 2:
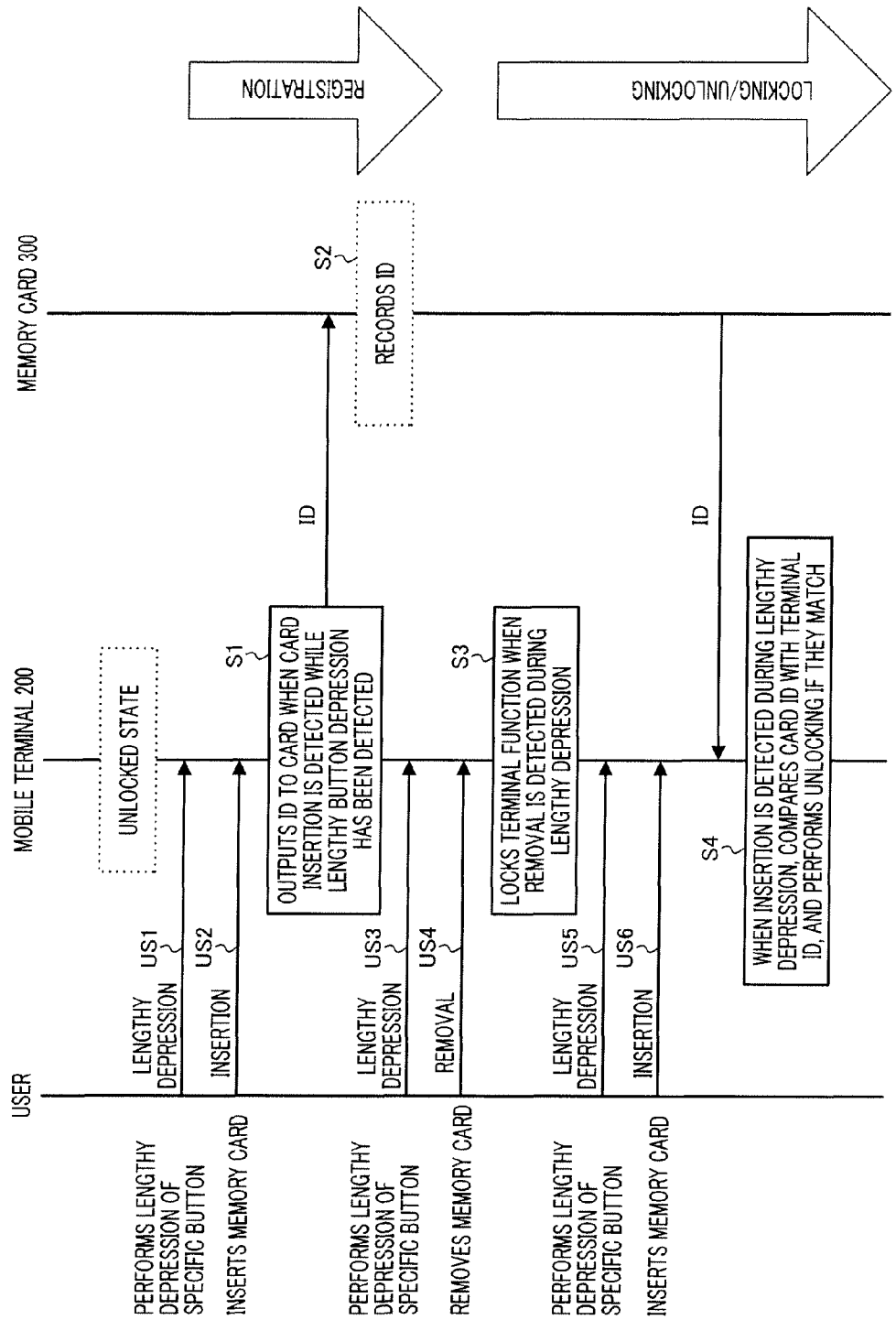
FIG. 2 is a sequence diagram explaining the processing when a function of a mobile terminal is locked in a mobile terminal system according to one embodiment of the present invention.

FIG. 2 is a sequence diagram explaining the processing when a mobile terminal 200 function is locked in mobile terminal system 100 according to one embodiment of the present invention.

In the description of this terminal function locking processing, memory card 300 inserted in mobile terminal 200 may have an ID in advance, or may not. Also, memory card 300 may be a memory card equipped with a card control section, or may be a memory card with no card control section.

When performing terminal function locking processing, first, registration is performed for mobile terminal 200 and memory card 300 inserted in that mobile terminal 200. Also, a terminal function to be locked (for example, power supply, keys, etc.) is set in locking target setting section 216 of mobile terminal 200.

Registration Stage

As shown in FIG. 2, if it is wished to temporarily lock a mobile terminal 200 terminal function when a memory card 300 is removed after being temporarily inserted in a mobile terminal 200 that is in an unlocked state and has no memory card inserted, the user inserts memory card 300 (US2) while performing lengthy depression of the specific button (US1).

Then, in step S1, mobile terminal 200 detects card insertion while lengthy button depression has been detected, and outputs an ID to memory card 300.

At this time, on the mobile terminal 200 side, terminal control section 220 stores (registers) the same ID as the ID registered in memory card 300. This ID registration is only performed initially when memory card 300 is inserted, and therefore a configuration may also be used whereby setting is performed from the display screen (not shown) of mobile terminal 200 instead of using lengthy depression of a specific button.

The mobile terminal system 100 processing performed in this registration stage will now be described in detail.

When the specific button is pressed by the user for a predetermined time, in mobile terminal 200 long-depression detection section 204 detects depression for a predetermined time (for example, one second or longer) as a long-depression state, and outputs long-depression state information indicating a long-depression state to terminal control section 220. Also, card insertion/removal detection section 208 detects the insertion of memory card 300 into slot section 206, and outputs card insertion information indicating card insertion to terminal control section 220.

In step S1, using the input information, if card insertion information is input while long-depression state information is being input, terminal control section 220 writes an ID to card-side ID storage section 304 of memory card 300 via ID read/write section 214. That is to say, an ID is output from mobile terminal 200 to memory card 300, and in step S2, memory card 300 records the input ID in card-side ID storage section 304. When the ID is output to memory card 300, terminal control section 220 stores an ID identifying that memory card 300, the same as the ID written to card-side ID storage section 304 of memory card 300, in ID storage section 212 of mobile terminal 200.

Figure 3A:
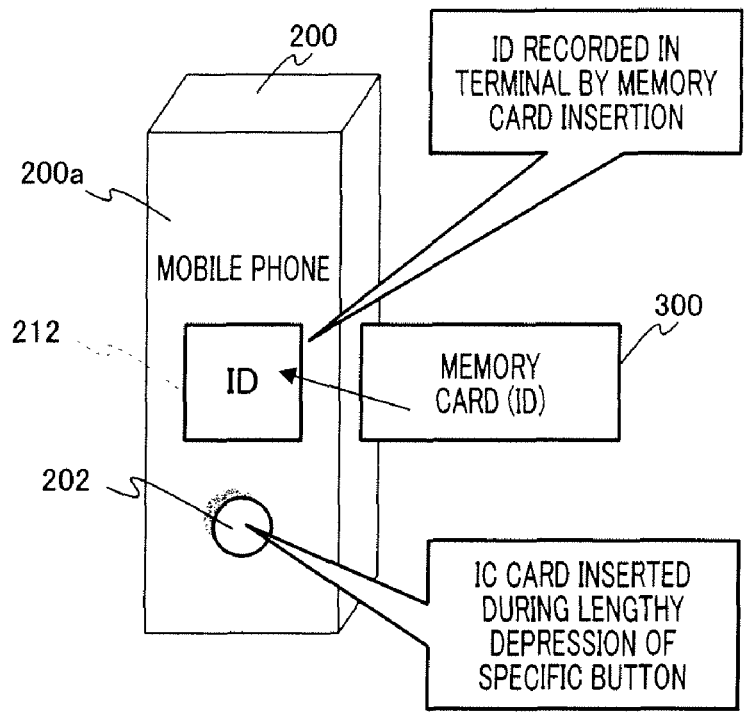
FIG. 3A is a conceptual diagram explaining ID registration in terminal function locking processing, showing a case in which a memory card inserted in a mobile terminal has an ID identifying that memory card beforehand.
Figure 3B:
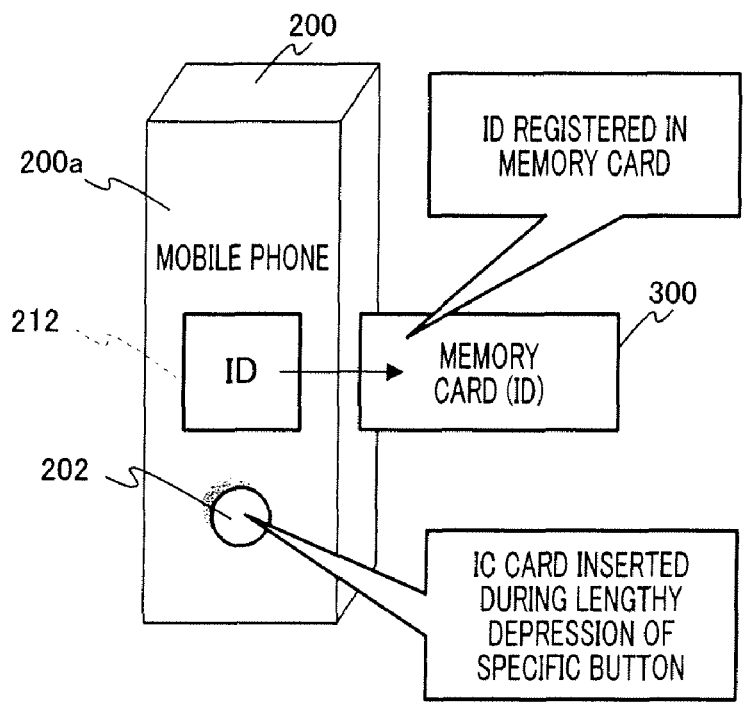
FIG. 3B is a conceptual diagram explaining ID registration in terminal function locking processing, showing a case in which a memory card inserted in a mobile terminal does not have an ID.

FIG. 3 is a drawing explaining ID registration in terminal function locking processing. FIG. 3A shows a case in which memory card 300 inserted in mobile terminal 200 has an ID identifying that memory card beforehand, and FIG. 3B shows a case in which memory card 300 does not have an ID.

When a memory card 300 with an ID is inserted into slot section 206 of mobile terminal 200 during lengthy depression of the specific button, as shown in FIG. 3A, the ID held by memory card 300 is stored in mobile terminal 200 by memory card 300 insertion.

On the other hand, when a memory card 300 with no ID is inserted into slot section 206 of mobile terminal 200 during lengthy depression of the specific button, as shown in FIG. 3B, an ID is stored in memory card 300 from mobile terminal 200.

In this registration stage, if memory card 300 is inserted into mobile terminal 200 without specific button 202 being pressed, an ID is not registered in mobile terminal 200 or memory card 300.

This completes the registration stage in mobile terminal 200 terminal function locking processing.

Locking/Unlocking Stage

Returning to FIG. 2, in the locking stage in terminal function locking processing, the user removes memory card 300 from mobile terminal 200 (US4) while performing lengthy depression of specific button 202 (see FIG. 1 and FIG. 3) (US3).

Then, in step S3, when mobile terminal 200 detects the removal of memory card 300 while lengthy depression of the specific button has been detected, mobile terminal 200 locks a mobile terminal 200 terminal function.

More specifically, when specific button 202 is pressed by the user for a predetermined time, in mobile terminal 200 long-depression detection section 204 detects depression for a predetermined time (for example, one second or longer) as a long-depression state, and outputs long-depression state information indicating a long-depression state to terminal control section 220. Also, card insertion/removal detection section 208 detects the removal of memory card 300, and outputs card removal information to terminal control section 220.

When terminal control section 220 receives these items of information, if removal information is input while long-depression state information is being input, terminal control section 220 locks a terminal function set by locking target setting section 216 via locking execution section 218.

FIG. 4 is a conceptual diagram illustrating a mobile terminal 200 for which terminal function locking processing is performed. FIG. 4A is a conceptual diagram showing a mobile terminal in which a terminal function is in an unlocked state in terminal function locking processing, and FIG. 4B is a conceptual diagram showing a mobile terminal in which a terminal function is in a locked state.

As shown in FIG. 4, in mobile terminal 200 in an unlocked state, a mobile terminal 200 function is locked when memory card 300 is removed during lengthy depression of specific button 202. A mobile terminal 200 function is not locked if memory card 300 is removed without the specific button being pressed.

By this means, a predetermined mobile terminal 200 function is locked when memory card 300 is removed.

Returning to FIG. 2, the function unlocking stage in terminal function locking processing will now be described.

In the function unlocking stage in terminal function locking processing, the user inserts memory card 300 into slot section 206 of mobile terminal 200 (US6) while performing lengthy depression of specific button 202 (see FIG. 1) (US5).

Then, in step S4, when mobile terminal 200 detects the insertion of memory card 300 during lengthy button depression, mobile terminal 200 compares the ID of memory card 300 with the ID stored in mobile terminal 200 itself, and if they match, unlocks a locked terminal function.

To explain this kind of function unlocking stage in detail, when the specific button is pressed by the user for a predetermined time, in mobile terminal 200 long-depression detection section 204 detects depression for a predetermined time (for example, one second or longer) as a long-depression state, and outputs information indicating a long-depression state to terminal control section 220. Also, card insertion/removal detection section 208 detects the insertion of memory card 300 into slot section 206, and outputs card insertion information to terminal control section 220.

When terminal control section 220 receives these items of information, if card insertion information is input while long-depression state information is being input, an ID is input from memory card 300 to ID comparison section 222 on the terminal side via ID read/write section 214. For example, terminal control section 220 detects that memory card 300 has been input during lengthy depression, and causes an ID in the ID storage section of memory card 300 to be read by ID read/write section 214.

If memory card 300 has a card control section 308, if an ID is caused to be output from card-side ID storage section 304 by card control section 308 when that memory card 300 is inserted into mobile terminal 200, the ID is input to ID read/write section 214.

Thus, in ID comparison section 222 of mobile terminal 200, an ID of ID storage section 212 of mobile terminal 200 and an ID acquired from memory card 300 are compared, and if the two match, a terminal function locked by locking execution section 218 is unlocked.

FIG. 5 is a conceptual diagram illustrating a mobile terminal 200 for which terminal function unlocking processing is performed. FIG. 5A is a conceptual diagram showing a mobile terminal in which a terminal function is in a locked state, and FIG. 5B is a conceptual diagram showing a mobile terminal in which a terminal function is in an unlocked state.

When memory card 300 is inserted into mobile terminal 200 shown in FIG. 5A during lengthy depression of the specific button, a mobile terminal 200 function is unlocked as shown in FIG. 5B. A mobile terminal 200 function is not unlocked if memory card 300 is inserted without the specific button being pressed.

By this means, a predetermined function can be unlocked for mobile terminal 200 in which a predetermined memory card 300 is inserted. A configuration may also be used whereby, if the two IDs compared in mobile terminal 200 match, the IDs are deleted after the comparison is performed. When terminal function locking is next performed, memory card 300 inserted in mobile terminal 200 is first removed, then reinserted while specific button 202 is pressed. By means of this operation, terminal control section 220 detects the insertion of memory card 300 during lengthy depression of specific button 202 using long-depression detection section 204 and card insertion/removal detection section 208, performs the above-described ID registration processing, and can share an ID identifying that memory card 300 with that memory card 300.

Thus, according to this mobile terminal system 100, in a mobile terminal 200 in which a memory card 300 is inserted in a removable fashion, a mobile terminal 200 terminal function can easily be locked by means of an intuitive operation by the user simply by removing memory card 300 during lengthy depression of a specific button 202. That is to say, mobile terminal 200 from which memory card 300 has been removed cannot use a predetermined function unless the removed memory card 300 is inserted.

<Memory Card Locking>

Figure 6:
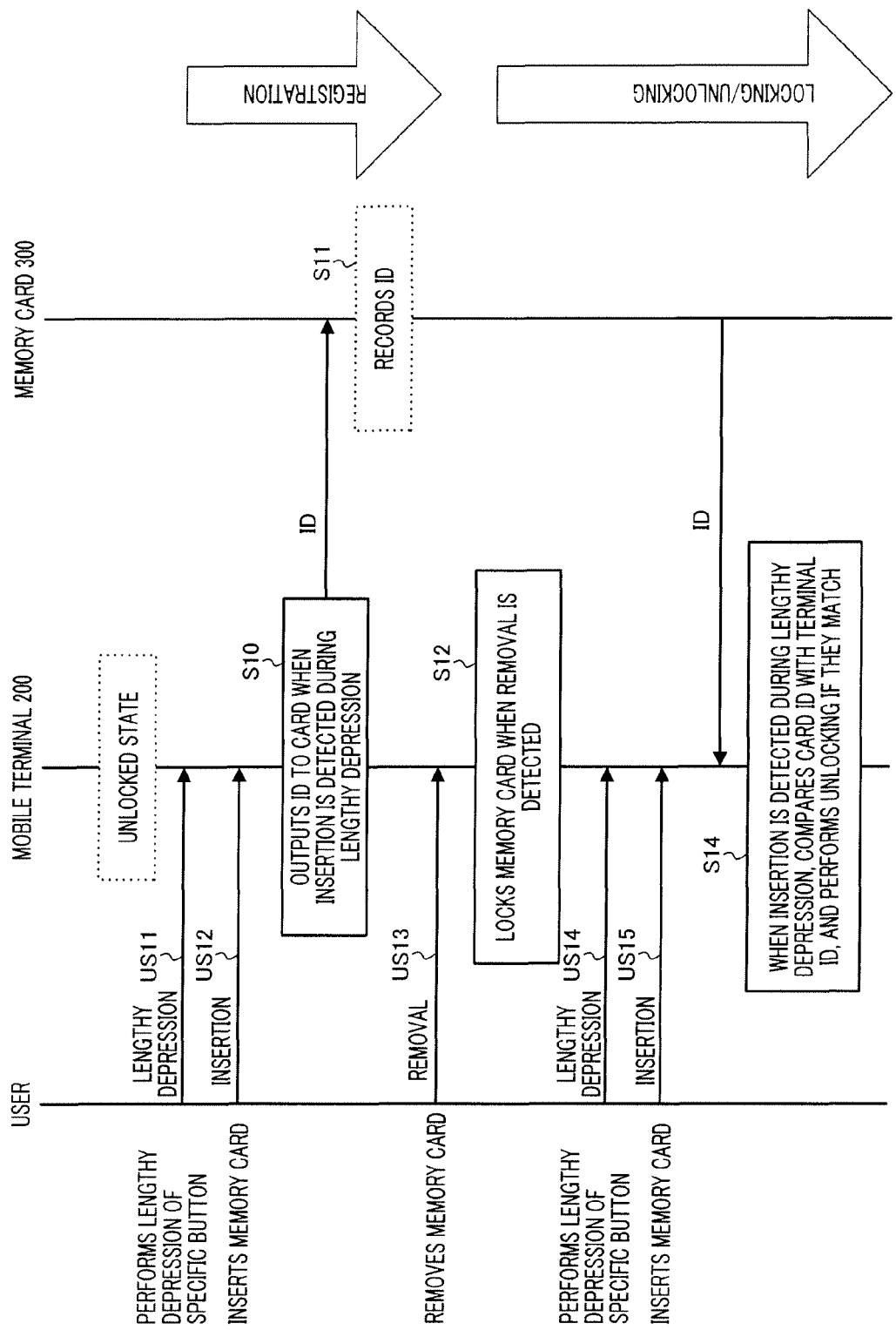
FIG. 6 is a sequence diagram explaining the processing when a memory card is locked in a mobile terminal system according to one embodiment of the present invention.

FIG. 6 is a sequence diagram explaining the processing when a memory card 300 is locked in a mobile terminal 200 system according to one embodiment of the present invention.

In the description of this memory card 300 locking processing, memory card 300 inserted in mobile terminal 200 is here assumed not to have an ID. Also, memory card 300 inserted in mobile terminal 200 may be a memory card 300 equipped with a card control section 308, or may be a memory card 300 with no card control section 308.

When performing memory card 300 locking processing, first, in the same way as in above-described terminal function locking processing, registration is performed for mobile terminal 200 and memory card 300 inserted in that mobile terminal 200.

Also, the object to be locked is set as memory card 300 in locking target setting section 216 of mobile terminal 200. Here, memory card 300 locking is taken to mean that memory card 300 cannot be used when inserted in a reading apparatus—that is, reading/writing from/to ordinary memory section 306 of memory card 300 cannot be performed.

Registration Stage

As shown in FIG. 6, if it is wished to temporarily lock a memory card 300 removed after being temporarily inserted in a mobile terminal 200 that is in an unlocked state and in which memory card 300 has not yet been inserted, the user first performs lengthy depression of specific button 202 (see FIG. 1) (US11) and inserts memory card 300 (US12).

Then, in step S10, mobile terminal 200 detects card insertion while lengthy button depression has been detected, and registers an ID in memory card 300. At this time, the same ID as the ID registered in memory card 300 is also stored (registered) on the mobile terminal 200 side. This ID registration is only performed initially when memory card 300 is inserted, and therefore a configuration may also be used whereby setting is performed from the display screen (not shown) of mobile terminal 200 instead of using lengthy depression of specific button 202.

More specifically, when the specific button is pressed by the user for a predetermined time, in mobile terminal 200 long-depression detection section 204 detects depression for a predetermined time (for example, one second or longer) as a long-depression state, and outputs long-depression state information indicating a long-depression state to terminal control section 220. Also, card insertion/removal detection section 208 detects the insertion of memory card 300, and outputs card insertion information indicating card insertion to terminal control section 220.

When terminal control section 220 receives these items of information, if card insertion information is input while long-depression state information is being input, terminal control section 220 writes an ID to card-side ID storage section 304 of memory card 300 inserted in slot section 206 via ID read/write section 214. That is to say, an ID is output from mobile terminal 200 to memory card 300, and in step S11, memory card 300 records the input ID in card-side ID storage section 304. When the ID is output to memory card 300, terminal control section 220 stores an ID identifying that memory card 300, the same as the ID written to memory card 300, in ID storage section 212 of mobile terminal 200.

Figure 7:
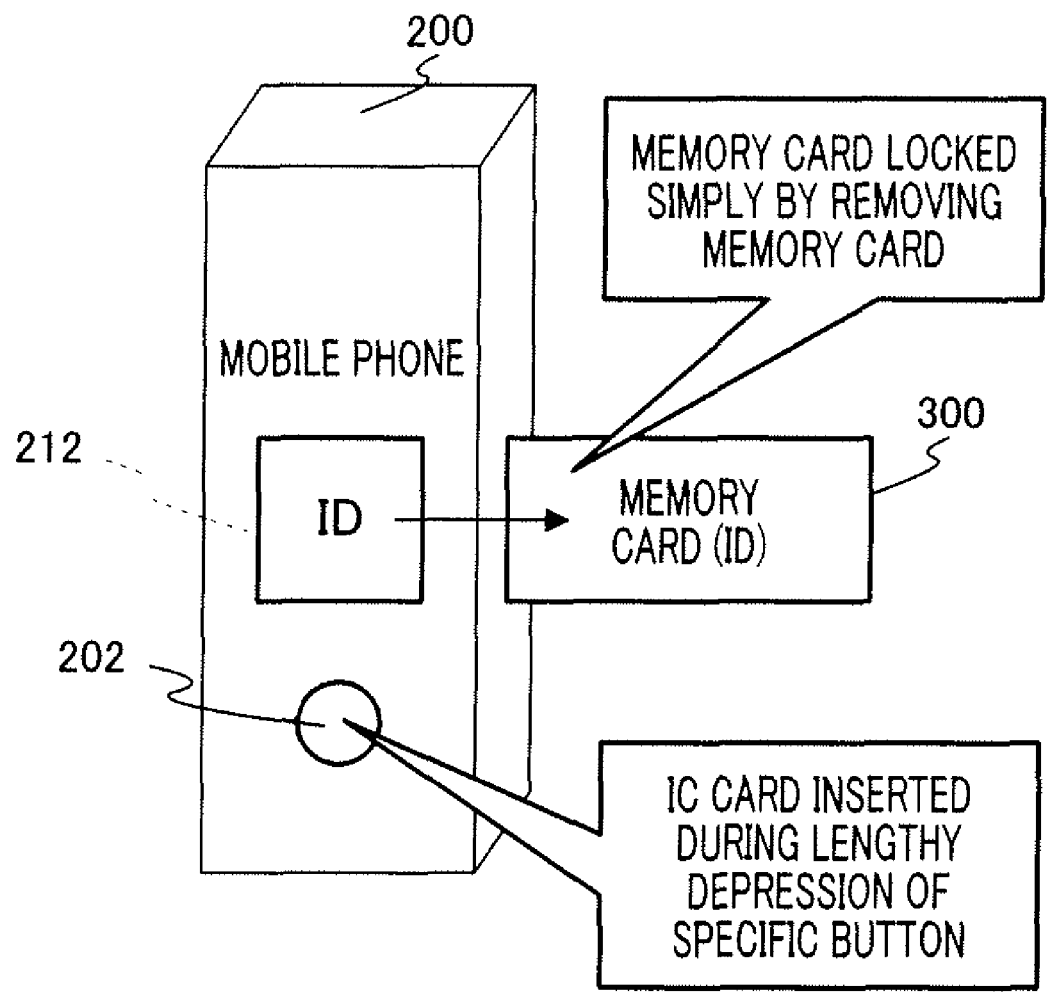
FIG. 7 is a conceptual diagram explaining ID registration in memory card locking processing.

FIG. 7 is a conceptual diagram explaining ID registration in memory card 300 locking processing.

When a memory card 300 with no ID is inserted into slot section 206 of mobile terminal 200 during lengthy depression of specific button 202, as shown in FIG. 7, an ID is stored in memory card 300 from mobile terminal 200.

In this registration stage, if memory card 300 is inserted into mobile terminal 200 without the specific button being pressed, an ID is not registered in mobile terminal 200 or memory card 300.

This completes the registration stage in memory card 300 locking processing.

Locking/Unlocking Stage

Returning to FIG. 6, in the locking stage in memory card 300 locking processing (card locking processing), the user removes memory card 300 from mobile terminal 200 (US13).

Then, in step S12, when mobile terminal 200 detects the card removal, mobile terminal 200 locks memory card 300 of mobile terminal 200.

More specifically, when memory card 300 is removed from slot section 206 by the user, card insertion/removal detection section 208 detects the removal of memory card 300 and inputs card removal information to terminal control section 220.

When this removal information is input to terminal control section 220, terminal control section 220 performs card locking processing corresponding to locking of memory card 300 set by locking target setting section 216 via locking execution section 218.

As the card locking processing performed here, two different kinds of processing are executed according to whether or not there is an IC function in memory card 300 inserted in mobile terminal 200, for example.

First Card Locking Processing (When Memory Card 300 is a Memory Card 300 with an IC Function)

Locking execution section 218 provides for memory card 300 not to react to card control section 308 of memory card 300 unless an ID input to memory card 300 from outside and an ID stored in card-side ID storage section 304 of memory card 300 are identical.

For example, when memory card 300 is connected to a reading apparatus, if an ID request is made to an accessing connection object and an ID is input, the IDs are compared by card-side ID comparison section 310, and if the IDs are not the same a program or the like is output that controls card control section 308 so as not to react. In this case, since ID comparison is performed on the memory card 300 side, there are fewer occasions for unauthorized viewing of information and so forth by a third party, and confidentiality and security are greater, than in the case of a memory card 300 with no IC function—that is, a memory card 300 with no control section.

Second Card Locking Processing (When Memory Card 300 has No IC Function)

Locking execution section 218 performs control so that there is no reaction unless an ID identical to an ID stored in ID storage section 212 of mobile terminal 200 is read from an inserted memory card 300 on the mobile terminal 200 side.

Specifically, locking execution section 218 stops the terminal IF section 210 function unless information indicating that an ID read from memory card 300 and an ID stored in the terminal are identical is input from terminal control section 220.

Figure 8:
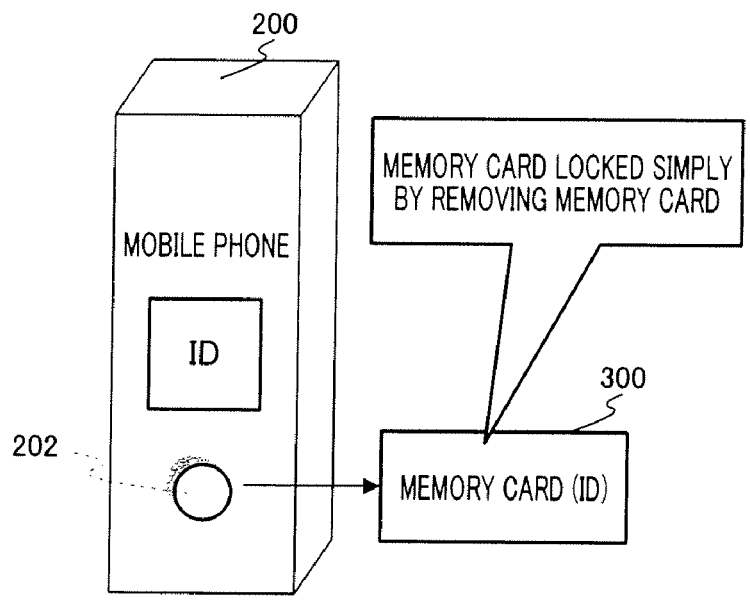
FIG. 8 is a conceptual diagram explaining the locking stage in memory card locking processing.

FIG. 8 is a conceptual diagram explaining the locking stage in memory card 300 locking processing.

As shown in FIG. 8, in the locking stage in memory card 300 locking processing, memory card 300 inserted in mobile terminal 200 need only be removed.

Next, returning to FIG. 6, the unlocking stage in memory card 300 locking processing will be described.

In the unlocking stage in memory card 300 locking processing, the user inserts memory card 300 into slot section 206 of mobile terminal 200 (US15) while performing lengthy depression of specific button 202 (US14).

Then, in step S14, when mobile terminal 200 detects the insertion of memory card 300 during lengthy button depression, mobile terminal 200 compares the ID of memory card 300 with the ID of the mobile terminal, and if they match, unlocks the locked memory card 300.

More specifically, when specific button 202 is pressed by the user for a predetermined time, in mobile terminal 200 long-depression detection section 204 detects depression for a predetermined time (for example, one second or longer) as a long-depression state, and outputs long-depression state information to terminal control section 220. Also, card insertion/removal detection section 208 detects the insertion of memory card 300, and outputs card insertion information to terminal control section 220.

When card insertion is performed during lengthy depression in this way, if there is no IC function in the inserted memory card 300, an ID is input by terminal control section 220 from memory card 300 to ID comparison section 222 on the mobile terminal 200 side via ID read/write section 214. For example, terminal control section 220 detects that memory card 300 has been input during lengthy depression, reads an ID in the ID storage section of memory card 300 by means of ID read/write section 214, and compares this ID with an ID held on the terminal side in ID storage section 212 by means of ID comparison section 222.

If memory card 300 is a memory card 300 with an IC function having a card control section 308, card control section 308 issues an ID request to mobile terminal 200 in which memory card 300 is inserted, causes an ID to be output from terminal-side ID storage section 212, and carries out a comparison by means of card-side ID comparison section 310.

Thus, the mobile terminal 200 ID and memory card 300 ID are compared by terminal-side ID comparison section 222 or card-side ID comparison section 310, and if the two match, memory card 300 is unlocked by unlocking control locked by locking execution section 218—that is, a state in which memory card 300 can be used by mobile terminal 200 is established.

Figure 9:
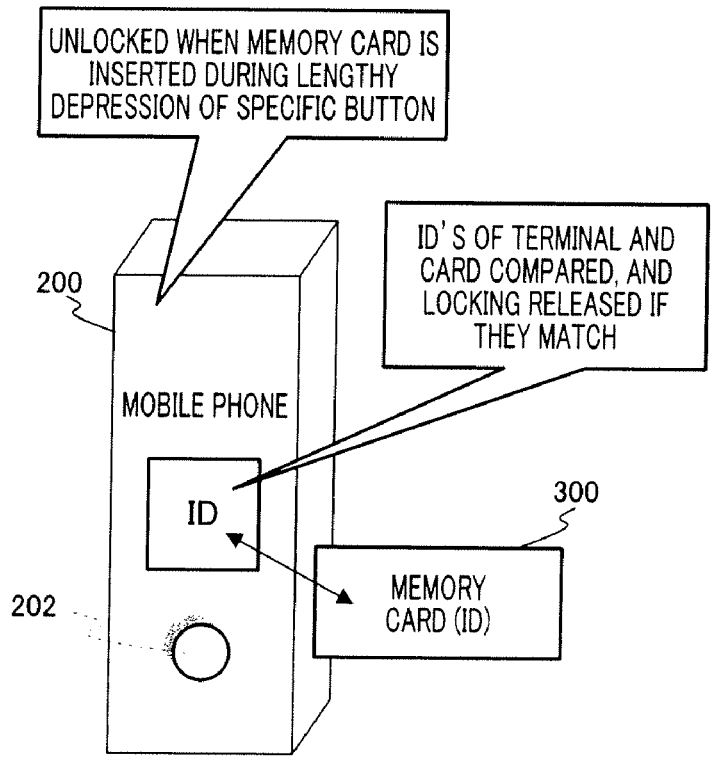
FIG. 9 is a conceptual diagram explaining the unlocking stage in memory card locking processing.

FIG. 9 is a conceptual diagram explaining the unlocking stage in memory card 300 locking processing.

When memory card 300 is inserted during lengthy depression of specific button 202, the IDs of mobile terminal 200 and memory card 300 are compared, and if they match, memory card 300 is unlocked. Memory card 300 is not unlocked if memory card 300 is inserted without the specific button being pressed.

By this means, memory card unlocking can be performed for a mobile terminal 200 in which a predetermined memory card 300 is inserted simply by performing lengthy depression of specific button 202 and inserting memory card 300. A configuration may also be used whereby, if the two IDs compared in either ID comparison section 222 or 310 of mobile terminal 200 or memory card 300 match, the IDs are deleted after the comparison is performed.

Thus, according to this mobile terminal system 100, in a mobile terminal 200 in which a memory card 300 is inserted in a removable fashion, memory card 300 can easily be locked simply by removing memory card 300 during lengthy depression of a specific button 202. That is to say, memory card 300 can be used only by a predetermined mobile terminal 200.

Here, a case has been described in which the function of memory card 300 itself—that is, its function as a storage medium—is locked, but this is not a limitation, and functions that memory card 300 has may also be partially locked and unlocked.

For example, if memory card 300 inserted in mobile terminal 200 is a memory card 300 with a noncontact IC function, it is also possible to lock a specific function of memory card 300.

<Memory Card Function Locking>

Figure 10A:
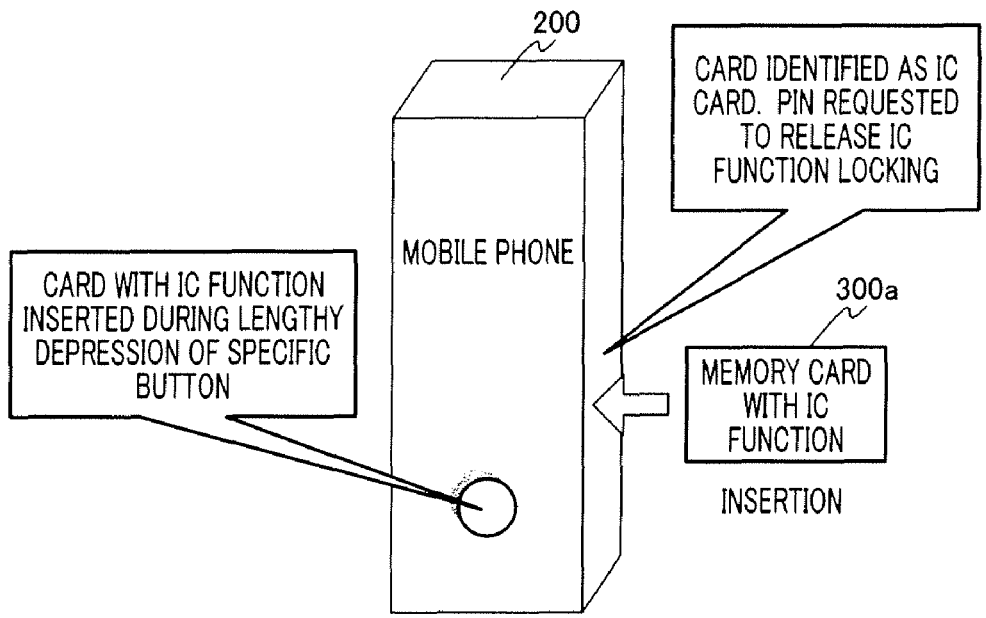
FIG. 10A is a conceptual diagram explaining the memory card function locking stage in a mobile terminal system according to an embodiment of the present invention.
Figure 10B:
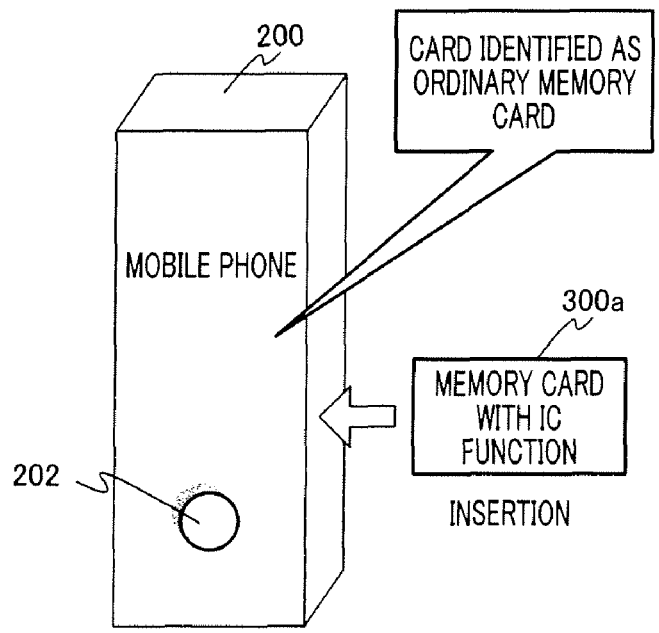
FIG. 10B is a conceptual diagram explaining the memory card function unlocking stage in a mobile terminal system according to an embodiment of the present invention.

FIG. 10 is a conceptual diagram explaining memory card function locking and unlocking used in a mobile terminal system 100 according to an embodiment of the present invention. FIG. 10A is a conceptual diagram explaining the memory card function locking stage in this mobile terminal system 100, and FIG. 10B is a conceptual diagram explaining the memory card function unlocking stage in this mobile terminal system 100.

In mobile terminal system 100 shown in FIG. 10A and FIG. 10B, a memory card inserted into mobile terminal 200 is a memory card with a noncontact IC function 300a. Memory card with a noncontact IC function 300a is configured in virtually the same way as a memory card 300 having a card control section 308, and therefore a description thereof is omitted here. The IC function part of memory card 300a is partially locked by inserting memory card 300a into, and unlocked by removing memory card 300a from, mobile terminal 200.

First, mobile terminal 200 stores an ID of memory card with a noncontact IC function 300a (for example, a PIN (Personal Identification Number)) in the ID storage section as an ID identifying memory card 300.

This ID storage processing is similar to the ID registration stage in terminal function locking processing when a memory card 300 having an ID is inserted into mobile terminal 200, and therefore a description thereof is omitted here.

Then, when a removed memory card with a noncontact IC function 300a is inserted directly into mobile terminal 200, as shown in FIG. 10A, mobile terminal 200 identifies memory card with an IC function 300a as an ordinary memory card 300a.

On the other hand, in FIG. 10B, memory card with an IC function 300a is inserted into slot section 206 during lengthy depression of the specific button of mobile terminal 200.

In this case, mobile terminal 200 identifies the inserted memory card 300 as a memory card with an IC function 300a, and displays a screen prompting ID (for example, PIN) input for IC function locking release.

When a PIN is input, mobile terminal 200 outputs the PIN to memory card with a noncontact IC function 300a, and card-side ID comparison section 310 of card control section 308 compares the PIN with a PIN possessed by memory card 300a itself. If the two PINs match, card control section 308 unlocks a locked function in memory card 300a for mobile terminal 200, and enables access from the mobile terminal 200 to which memory card 300a is connected.

When a PIN is input to mobile terminal 200, ID comparison section 222 on the mobile terminal 200 side may compare the PIN with the input PIN and determine whether or not the two match. In this case, a configuration is used such that memory card 300 IC function locking is released via locking execution section 218 if the two PINs match.

Also, when mobile terminal 200 identifies memory card 300a as a memory card or a memory card with an IC function, mobile terminal 200 may display an icon corresponding to the relevant card on the display section (not shown).

According to an apparatus of this embodiment, in a mobile terminal apparatus allowing insertion of a memory card or a memory card with an IC function in a removable fashion, partial functions and so forth among functions of a mobile terminal 200 and a memory card 300 or 300a can be locked simply by inserting or removing a memory card while performing lengthy depression of a specific button. By means of this locking, provision can be made for mobile terminal 200 to be able to use a predetermined function only when a specific memory card 300 or 300a is inserted. Also, provision can be made for a function of memory card 300 to be able to be used only when memory card 300 is inserted in a specific mobile terminal 200.

Thus, when a memory card 300 including a memory card 300 with an IC function, or a memory card with a noncontact IC function 300a, inserted in a mobile terminal 200, is inserted or removed, a function of at least one of terminal 200 itself and/or memory card 300 or memory card with a noncontact IC function 300a can be locked easily by means of an intuitive operation by the user.

INDUSTRIAL APPLICABILITY

A mobile terminal system, mobile terminal apparatus, and function locking method according to the present invention have an effect such that, when a memory card or memory card with an IC function inserted in a mobile terminal apparatus is removed, a function of at least one of the apparatus itself and/or the memory card is locked easily by means of an intuitive operation by the user, and are suitable for application to a mobile phone or the like allowing insertion of a memory card including a memory card with an IC function.

The invention claimed is:

1. A mobile terminal apparatus comprising:
a button;
a card slot configured to receive memory cards in a removable fashion; and
a controller configured to detect insertions of memory cards and durations of applications of pressure to the button, and to respond to a detected memory card insertion by,
when an application of pressure to the button having a duration longer than a threshold is detected concurrently with the insertion and a function of the apparatus is locked, selectively unlocking the function of the apparatus; and
when an application of pressure to the button having a duration longer than the threshold is not detected concurrently with the insertion and the function of the apparatus is locked, maintaining the lock of the function of the apparatus.

2. The mobile terminal apparatus according to claim 1, wherein the controller is further configured to selectively register memory cards inserted into the card slot when the memory card has not been registered.

3. The mobile terminal apparatus according to claim 2, wherein the selectively registering includes, registering the memory card when an application of pressure to the button having a duration longer than a threshold is detected concurrently with the insertion.

4. The mobile terminal apparatus according to claim 2, further comprising:
an ID storage section configured to store at least one ID to identify one or more memory cards, wherein
the registering comprises writing an ID stored in said ID storage section to said memory card.

5. The mobile terminal apparatus according to claim 4 wherein the registering comprises generating an ID and writing the ID to the ID storage section and the memory card.

6. The mobile terminal apparatus according to claim 4 wherein
at least one of an inserted memory card and said mobile terminal apparatus includes an ID comparison section configured to compare IDs stored on said memory card and said mobile terminal apparatus; and the selectively unlocking comprises unlocking the function when the IDs stored on the inserted memory card and said mobile terminal apparatus match.

7. The mobile terminal apparatus according to claim 1 wherein the controller is further configured to selectively lock the function when removal of the memory card is detected.

8. The mobile terminal apparatus according to claim 7 wherein the selectively locking includes locking the function when the removal of the memory card is detected concurrent with detection of an application of pressure to the button having duration longer than the threshold.

9. The mobile terminal apparatus according to claim 1 wherein the controller is further configured to set the function.

10. The apparatus of claim 1 wherein the function is an ability to access data recorded on an inserted memory card.

11. A memory card, comprising:

a memory;

a controller configured to detect insertions of the memory card into a card slot of a terminal apparatus, to receive an indication of an application of pressure to a button of the terminal apparatus having a duration longer than a threshold, and to respond to a detected insertion of the memory card into the card slot by, when the insertion is detected with concurrent reception of the indication and a function of the memory card is locked, selectively unlocking the function of the memory card; and when the insertion is detected without reception of the indication and the function of the memory card is locked, maintain the lock of the function of the memory card.

12. The memory card of claim 11 wherein the memory card is configured to record an ID, the indication comprises an ID received from the terminal apparatus in response to the application of pressure to the button of the terminal apparatus having the duration longer than the threshold, the controller is further configured to compare IDs recorded on the memory card and received from the terminal apparatus, and the selectively unlocking comprises unlocking the function of the memory card when IDs recorded on the memory card and transmitted from the terminal apparatus match.

13. The memory card of claim 11 wherein the controller is further configured to intercept access requests from the terminal apparatus, and the function of the system is accepting access requests from the terminal apparatus to data stored in the memory card.

14. A method, comprising:

detecting an insertion of a memory card into a memory card slot of a terminal apparatus occurring during an activation of a button for a period of time longer than a threshold period of time;

selectively unlocking a function of at least one of the memory card and the terminal apparatus, when an application of pressure to the button having a duration longer than a threshold is detected concurrently with the insertion and a function of the apparatus is locked; and maintaining a lock of the function of the at least one of the memory card and the terminal apparatus, when an application of pressure to the button having a duration longer than the threshold is not detected concurrently with the insertion and the function of the apparatus is locked.

15. A controller, comprising:

means for determining when a memory card is inserted into a memory card slot of a terminal apparatus during an activation of a button for a period of time longer than a threshold period of time;

means for selectively unlocking a function of at least one of the memory card and the terminal apparatus based on the determining, when an application of pressure to the button having a duration longer than a threshold is detected concurrently with the insertion and a function of the apparatus is locked; and means for maintaining a lock of the function of at least one of the memory card and the terminal apparatus, when an application of pressure to the button having a duration longer than the threshold is not detected concurrently with the insertion and the function of the apparatus is locked.

16. The controller of claim 15 wherein the memory card includes the means for selectively unlocking a function.

* * * * *